May 30, 1950 — M. L. SCHEINER — 2,509,401
METHOD AND APPARATUS FOR THE TESTING OF REACTANCES
Filed March 29, 1945 — 2 Sheets-Sheet 1

WITNESS: Rob't R. Mitchel.

INVENTOR
Martin L. Scheiner
BY Busser & Harding
ATTORNEYS.

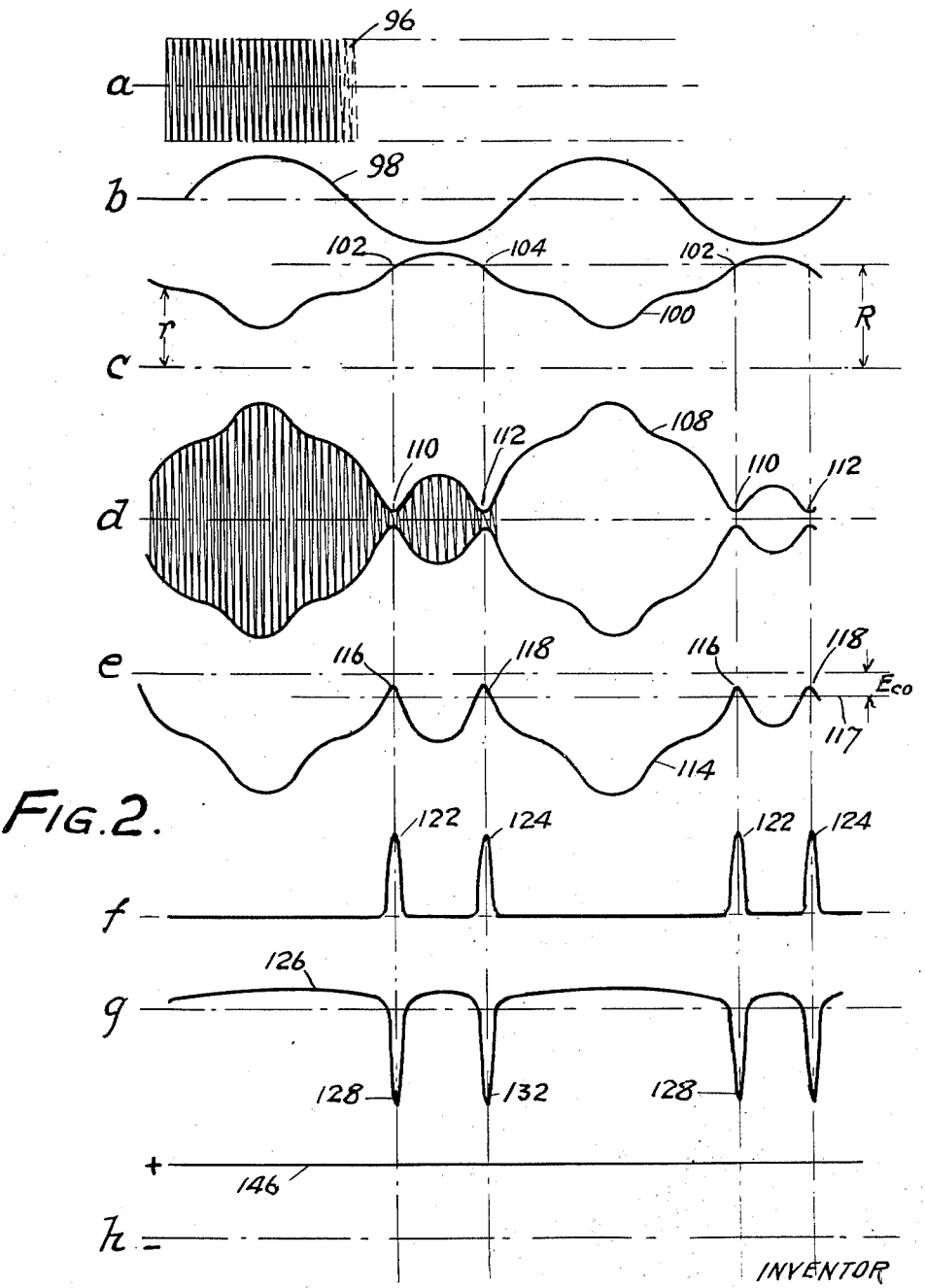

Patented May 30, 1950

2,509,401

UNITED STATES PATENT OFFICE 2,509,401

METHOD AND APPARATUS FOR THE TESTING OF REACTANCES

Martin L. Scheiner, New York, N. Y., assignor to Sherron Metallic Corporation, Brooklyn, N. Y., a corporation of New York Application March 29, 1945, Serial No. 585,551

6 Claims. (Cl. 175—183)

This invention relates to methods and apparatus for the testing of reactances and in particular to testing reactances for what is commonly called Q which is the ratio of reactance to resistance of a coil or condenser. The value of the ratio just mentioned is a figure of merit of a reactive element since the higher this value of Q may be, the greater the selectivity and the amplification of a stage in which the reactor is used.

Heretofore it has been customary to measure Q in a simple resonant circuit. When the circuit is adjusted to resonance the ratio of the voltage across the reactance to the impressed voltage is very nearly the Q of the circuit.

It will be evident, however, that this procedure is not satisfactory for the measurement of Q of large numbers of reactances which have reactance values varying plus or minus from some nominal reactance value as, for example, in the case of commercial condensers or coils. Generally speaking, these are supplied with a substantial permissible tolerance and readjustment of a resonance apparatus of the type indicated is necessary for each one.

The general object of the present invention is the provision of a method and apparatus adapted for the indication of the Q of reactances, i. e., coils or condensers, in such fashion that without manual adjustment proper indications are given irrespective of minor variations in reactance values. Specifically this involves the use of a bridge circuit in which the reactance to be tested is balanced against a high quality reactance such as a high quality coil in the testing of coils or a high quality air condenser in the case of testing of condensers. The circuit is so arranged that the bridge oscillates back and forth so that the balance point varies over a range corresponding to the range of the tolerance for the reactance being tested. In the case of testing a condenser, for example, the oscillating balance is made only for the capacitive component of the condenser being tested. If the condenser has a resistive component of zero, corresponding to an infinite Q, then zero output would be obtained at some point as the bridge oscillates through balance. This will be true because two of the arms of the bridge are pure capacitance, and the other two are pure resistance, as will be explained.

For condensers which have a resistive component, the minimum value of voltage output from the bridge will not be zero, but will be proportional to the resistive component of the condenser, or inversely proportional to the Q. The same type of system is involved in the testing of a coil.

Generally speaking, in a testing apparatus of this type the value of Q is not always of interest but what is often desired is a determination of whether or not the Q is above some predetermined minimum value. In accordance with the present invention, an apparatus and a method are provided for causing the production of a signal, or absence of a signal, or a rejection action when the value of Q is not in the desired upper range.

The above indicated objects of the invention and other objects particularly relating to details of construction and operation will become apparent from the following description read in conjunction with the accompanying drawings in which:

Figure 2 is a series of graphs indicating the relationships of certain currents and voltages involved in the apparatus of Figure 1.

Figure 1:
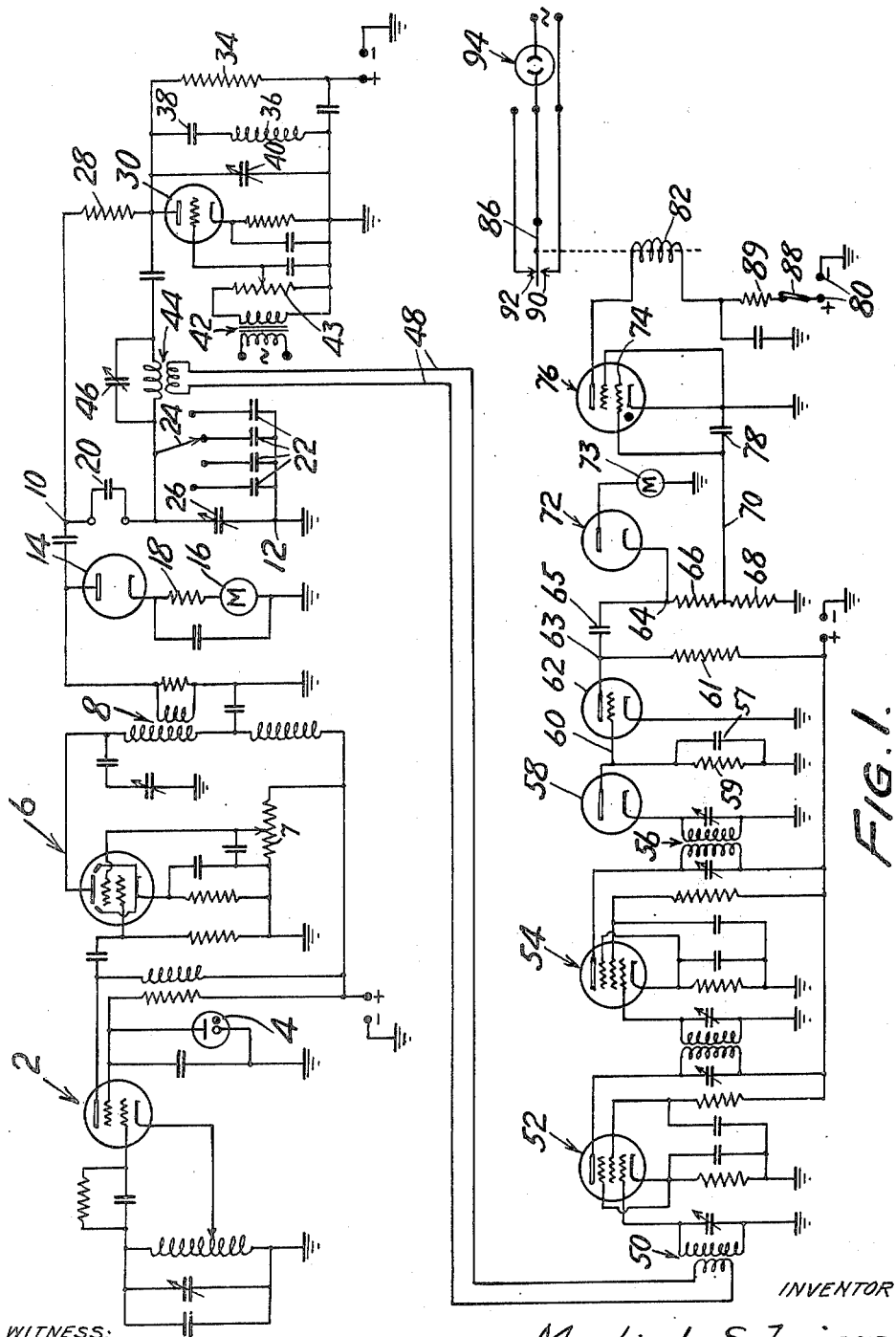
Figure 1 is a wiring diagram of a preferred type of apparatus embodying the invention and utilized for carrying out the method.

Referring first to Figure 1, the apparatus comprises a high frequency generator which may be of any conventional type adapted to produce an output of the frequency at which it is desired to test the reactances. For example, this generator may provide an output at one megacycle which is sufficiently high for most purposes. Two vacuum tubes such as indicated at 2 and 6, together with conventional circuits, including a voltage regulator tube 4, provide the generator, the output of which can be varied by potentiometer 7, and is delivered through a transformer indicated at 8 to the measuring bridge circuit proper. The input to the bridge occurs across the points 10 and 12, across which there may also be provided a metering circuit from which the voltage output of the generator may be determined. This may comprise, for example, a diode 14, in series with a D. C. meter 16 and a suitable resistance 18. The input to the bridge should be held at a substantially constant amplitude which may be continuously checked by this meter arrangement.

For simplicity of further discussion it will be assumed that the circuit is arranged to measure the Q condensers, it being obvious, however, that reactors may have their Q values equally well measured by the circuit merely by the substitution of standard high Q coils for the standard condensers against which balance is made.

One arm of the bridge has inserted therein the condenser 20, the Q of which is to be indicated, suitable connections being provided so that condensers may be readily inserted in this location. The other arm of the same branch of the bridge is provided with a fixed capacity value which may be adjusted, for example, by the provision of a series of condensers 22 which may be selected by a switch 24 and which are shunted by an adjustable condenser 26. These condensers 22 and 26 are desirably of high quality air type, which can be considered to have zero resistance components, and adjustment in the operation of the apparatus is made so that the capacity in this arm of the bridge is the mean capacity of the range of condensers being tested.

One arm of the other branch of the bridge is constituted by a fixed resistor 28. The other arm of the same branch consists of the plate-to-cathode resistance of a vacuum tube 30 together with a suitable network comprising, for example, the adjustable condenser 40, the series arrangement of condenser 38 and coil 36 and a resistance 34, designed to present in this arm of the bridge a pure resistance.

A commercial frequency alternating current at, for example, 60 cycles, provides through a transformer 42 and a potentiometer 43 a low frequency alternating potential to the grid of the tube 30. As a result of this the resistance of this arm of the bridge is caused to vary above and below some mean value at a frequency corresponding to that of the low frequency alternating supply.

The output of the bridge is taken from a transformer 44 the primary of which is tuned by a variable condenser 46. This output is delivered through connection 48 to the transformer 50 constituting the input of a two stage amplifier comprising the tubes 52 and 54 and their conventional tuned circuits, all of the tuning being to the frequency of the oscillator. The output of the amplifier is fed through a transformer 56 between the ground and the cathode of a diode 58 to provide across a load resistor 59, shunted by a condenser 57, a rectified potential which is fed from point 60 to the grid of a tube 62 provided with a load resistor 61. The plate of the tube 62 is connected at 63 through a condenser 65 to the cathode of a tube 72 at 64 and through series resistances 66 and 68 to ground. The junction between resistances 66 and 68 is connected at 70 to the grid 74 of a gas filled tube 76 of the thyratron or trigger type such as the 2051. The cathode of this tube is connected to ground and a condenser 78 bridges the grid and cathode. The plate of the tube 76 is provided with a direct high voltage from a source 80 through a switch 88 and a relay coil 82 which is provided with an armature 86. This armature is designed to effect control or signaling by making alternate contact with the contact points 90 and 92. For signaling purposes a lamp such as a neon lamp 94 may be interposed in one of the circuits, being energized from the commercial power supply.

Switch 88 is provided to open the plate circuit of tube 76 so as to deionize the gas tube. This switch might be opened simultaneously with the changing of condenser 20, either by an automatic mechanical means, or by some other method.

It will be understood that high voltage and cathode heating supplies are provided in accordance with conventional practice.

The operation of the circuit may now be made clear by considering Figure 2 in connection with Figure 1. In Figure 2 there are shown the voltages and currents which exist at various parts of the circuit during operation.

The graph $a$ indicates the constant amplitude high frequency input 96 to the bridge. The use of a voltage regulator tube 4 as shown maintains this amplitude essentially constant as is desirable to secure sharp and accurate indications of the value Q of the condenser or reactor being tested.

In this graph at $b$ the curve 98 represents more or less the sinusoidal voltage which is applied to the grid of tube 30.

At $c$ the curve 100 indicates the varying value of resistance $r$ which results in the arm of the bridge containing the tube 30. In the primary adjusting of the apparatus the choice of condenser 22 and the adjustment of trimming condenser 26 and of potentiometer 43 are so made that the average value of the resistance $r$ is that which will effect balance of the bridge at the nominal value of the condenser 20 of a group which is being tested. Due to the action of the low frequency alternating potential the value of $r$ is caused to vary above and below this average value through a range of value which would provide balance for all of the condensers within the limits of tolerance of the group being tested. For some particular condenser, balance of the bridge will occur at some value R of resistance $r$ which will be attained twice in each complete cycle of the low frequency potential, for example, at the points 102 and 104.

If the condenser were perfect it will be evident that complete balance of the bridge would occur at these points and the output thereof would be zero. If, however, as will be the case in ordinary operation, the condensers are not perfect, the bridge output will not be reduced to zero at the balanced points but rather will assume some minimum value which will be lower as the Q of the condenser is higher. In short, the output of the bridge appearing at the transformer 44 will have the characteristics indicated at 108 in graph $d$. The output will consist of a modulated high frequency current having an amplitude proportional to the deviation of the instantaneous value of $r$ from the balance value, R.

The minimum values of output, occurring at 110 and 112 correspond to the points 102 and 104 at which the value of $r$ is equal to R. The amplitude at the points of minimum output will be related to the Q of the condenser undergoing test, the amplitude at these points being large if the value of Q is low and being small if the value of Q is high, since the bridge will be perfectly balanced, and thus give zero output, only if the condenser has an infinite value of Q.

The output of the bridge as represented in graph $d$ is fed through the amplifier comprising the tubes 52 and 54 and accordingly at 56 a somewhat similar output will result which, for the sake of the present description, may be assumed to take the same form as indicated in $d$, of course, greatly amplified. This output is then rectified by the diode 58 so that there will appear between point 60 and ground at the grid of the tube 62 a voltage as indicated at 114 in graph $e$ consisting of one-half the envelope of graph $d$. The high frequency component is filtered out by means of condenser 57, leaving only the envelope, and a D. C. component as shown in e.

This envelope, together with its D. C. component is applied to the grid of tube 62. The value of grid voltage necessary to cut off plate current of tube 62 is shown by line 117 in e. Because the envelope voltage will cause tube 62 to be biased beyond cut-off during most of the cycle, the plate current in tube 62 will have the form shown in graph f, where the points of maximum current, 122 and 124 correspond to the balance points 102 and 104.

The peaks of this current are proportional to the amount below cut-off which the voltage of graph e reaches. Since, by adequate amplification in tubes 52 and 54, the amplitude of the voltage of graph e can be made sufficiently large so that only very low values of negative minimum voltages, as at 116 and 118, will allow plate current flow in tube 62, the system can be made sensitive only to those very high values of Q which will produce minimums at 116 and 118 which are close to zero.

If the Q of the condenser being tested were of a comparatively low value, the minimum negative values of 116 and 118 might have a value greater than cut-off of tube 62. This would result in no current flow in tube 62 since it would always be biased beyond cut-off.

For this reason, the generator is provided with potentiometer 7 which will permit varying the output voltage from the generator. With reduced input to the bridge, the output envelope shown in graph e will have the same shape, but will be reduced in amplitude, thus causing the minimum value at 116 and 118 to fall within cut-off and permitting lower Q's to be checked than would be possible if the input voltage to the bridge were fixed. The meter 16 which indicates input voltage to the bridge can therefore be used to set the bridge input at such a value that a desired Q will produce a desired plate current in tube 62. This meter can thus be calibrated in terms of Q for a plate current in tube 62.

The plate current of tube 62 produces an A. C. voltage output from tube 62 with a waveform as shown in graph g. The negative peaks of this voltage, 128 and 132, are proportional to the Q of the condenser being checked. This voltage is applied to diode 72, which forms a peak detector, along with condenser 65 and resistors 66 and 68. The output voltage of this peak detector is filtered by resistor 66 and condenser 78, and the resultant voltage is shown in graph h. It is a relatively pure positive D. C. potential across resistor 68 whose magnitude is proportional to the peaks 128 and 132 and therefore to the Q of the condenser under test. This potential is applied to the control grid of the gas tube 76. If the value of Q is large, the positive potential appearing at the grid of the gas tube will be correspondingly large while if small it will be correspondingly small.

The gas tube is so operated that its firing depends upon the attainment of a predetermined positive value of its grid potential. If the value exceeds this predetermined value the tube will fire and its ionization will permit current to flow sufficient to energize the relay coil 82 and attract the armature. The attraction of 86 will energize the lamp 84 which, by the fact of its lighting, will indicate that the condenser tested has an acceptably high Q value. On the other hand, if the value of Q is too low the tube will not fire. It will be evident that instead of mere indication a control arrangement may be provided for automatically rejecting the unsatisfactory condensers or for segregating them from satisfactory ones.

As is common with gas tubes, when once fired or ionized they will remain conductive until the positive anode potential is removed. If the tube is supplied with a D. C. high voltage source as indicated, this result may be achieved by momentarily opening the anode circuit by means of switch 88. This switch may be actuated by some other operation such as by the mechanism which segregates the satisfactory condensers from the unsatisfactory ones if an automatic system is used.

It will be evident that the operation may be reversed by connecting the anode rather than the cathode of tube 72 to the point 64 in which case, however, the absence of a condenser from the testing arm of the bridge would result in firing of the tube. It will be clear that many variations in the latter part of this circuit are possible without departing from the principles here involved.

It will be evident from the foregoing that an indication of the Q of a condenser or coil may be obtained without manual adjustment for such impedances so long as they fall within the limits corresponding to the swing of resistance values in the arm of the bridge containing the tube 30. While a simple indication is specifically provided in accordance with the circuit described as to whether a reactance has or has not a proper Q value, the actual value of Q may be indicated, for example, by a meter such as 73 in series with the diode 72 or otherwise located in the circuit to give a current reading corresponding to the amplitude of the surges produced as the bridge passes through a balanced condition.

What I claim and desire to protect by Letters Patent is:

1. Apparatus for testing a reactance for its Q value comprising a bridge of the balanceable type having in its respective arms connections for the reactance to be tested, a second reactance substantially free of a resistive component, and a pair of impedances, means for energizing said bridge with alternating current, means periodically varying one of said impedances through a value causing the amplitude of the alternating output of the bridge to pass through a minimum value, said periodic variation being at a frequency substantially lower than the frequency of said alternating current, and means rectifying the output of the bridge and producing a signal having an amplitude bearing a functional relationship to said minimum value of the bridge output.

2. Apparatus for testing a reactance for its Q value comprising a bridge of the balanceable type having in its respective arms connections for the reactance to be tested, a second reactance substantially free of a resistive component, and a pair of resistances, means for energizing said bridge with alternating current, means periodically varying one of said resistances through a value causing the amplitude of the alternating output of the bridge to pass through a minimum value, said periodic variation being at a frequency substantially lower than the frequency of said alternating current, and means rectifying the output of the bridge and producing a signal having an amplitude bearing a functional rela- 3. Apparatus for testing a reactance for its Q value comprising a bridge of the balanceable type having in its respective arms connections for the reactance to be tested, a second reactance substantially free of a resistive component, and a pair of impedances, one of which comprises a vacuum tube, means for energizing said bridge with alternating current, means periodically varying the impedance of said vacuum tube through a value causing the amplitude of the alternating output of the bridge to pass through a minimum value, said periodic variation being at a frequency substantially lower than the frequency of said alternating current, and means rectifying the output of the bridge and producing a signal having an amplitude bearing a functional relationship to said minimum value of the bridge output.

4. Apparatus for testing a reactance for its Q value comprising a bridge of the balanceable type having in its respective arms connections for the reactance to be tested, a second reactance substantially free of a resistive component, and a pair of impedances, means for energizing said bridge with alternating current, means periodically varying one of said impedances through a value causing the amplitude of the alternating output of the bridge to pass through a minimum value, said periodic variation being at a frequency substantially lower than the frequency of said alternating current, and means providing an amplified electrical signal bearing a functional relationship to said minimum value of the amplitude of the bridge output.

5. Apparatus for testing a reactance for its Q value comprising a bridge of the balanceable type having in its respective arms connections for the reactance to be tested, a second reactance substantially free of a resistive component, and a pair of impedances, means for energizing said bridge with alternating current, means periodically varying one of said impedances through a value causing the amplitude of the alternating output of the bridge to pass through a minimum value, said periodic variation being at a frequency substantially lower than the frequency of said alternating current, means providing an amplified electrical signal bearing a functional relationship to said minimum value of the amplitude of the bridge output, and a grid-controlled gas tube arranged to be fired upon occurrence of a predetermined value of said electrical signal.

6. Apparatus for testing a reactance for its Q value comprising a bridge of the balanceable type having in its respective arms connections for the reactance to be tested, a second reactance substantially free of a resistive component, and a pair of impedances, means for energizing said bridge with alternating current, means periodically varying one of said impedances through a value causing the amplitude of the alternating output of the bridge to pass through a minimum value, said periodic variation being at a frequency substantially lower than the frequency of said alternating current, means rectifying the output of the bridge and producing a signal having an amplitude bearing a functional relationship to said minimum value of the bridge output, and a grid-controlled gas tube arranged to be fired upon occurrence of a predetermined value of said signal.

MARTIN L. SCHEINER.

REFERENCES CITED

The following references are of record in the file of this patent:

UNITED STATES PATENTS

| Number | Name | Date |
|---|---|---|
| 1,847,127 | Mayer | Mar. 1, 1932 |
| 2,063,125 | Rust | Dec. 8, 1936 |
| 2,321,605 | Keinath | June 15, 1943 |
| 2,329,098 | Browning et al. | Sept. 7, 1943 |

OTHER REFERENCES

Radio World; August 1938, pp. 12–15.

Alternating Bridge Methods; Hague; 4th ed., 1938; Pitman Pub. Corp., New York City, pp. 327–329.

Proc. of the I. R. E.; 1943, pp. 653, 656.